United States Patent
Mazzola

(10) Patent No.: US 7,383,343 B2
(45) Date of Patent: Jun. 3, 2008

(54) SYSTEM USING PORTAL SERVICE INTERFACE TO REQUEST AND DETERMINE QOS REQUIREMENTS ON NON-QOS CAPABLE DEVICE ON A HOME NETWORK

(75) Inventor: Diego Raul Mazzola, Louisville, CO (US)

(73) Assignee: Texas Instruments Incorporated, Dallas, TX (US)

( * ) Notice: Subject to any disclaimer, the term of this patent is extended or adjusted under 35 U.S.C. 154(b) by 962 days.

(21) Appl. No.: 10/748,369

(22) Filed: Dec. 29, 2003

(65) Prior Publication Data

US 2005/0149628 A1    Jul. 7, 2005

(51) Int. Cl.
*G06F 15/16* (2006.01)
(52) U.S. Cl. .................. 709/228; 709/226; 709/227
(58) Field of Classification Search ................ 709/225, 709/226, 227, 228, 229, 223, 232, 234; 370/395.21, 370/395.5, 395.52, 912, 397, 352, 338, 401, 370/236.1; 713/201
See application file for complete search history.

(56) References Cited

U.S. PATENT DOCUMENTS

| | | |
|---|---|---|
| 2002/0120749 A1 | 8/2002 | Widegren et al. |
| 2002/0133600 A1 | 9/2002 | Williams et al. |
| 2003/0115311 A1 | 6/2003 | Johnston-Watt et al. |
| 2003/0118028 A1* | 6/2003 | Neal et al. ............. 370/395.21 |

(Continued)

OTHER PUBLICATIONS

"CableHome® CAP MIB Specification", CH-SP-MIB-CAP-I04-030801, Copyright 2001-2003 Cable Television Laboratories, Inc., 15 pgs.

(Continued)

*Primary Examiner*—Le Luu
(74) *Attorney, Agent, or Firm*—Steven A. Shaw; W. James Brady; Frederick J. Telecky, Jr.

(57) ABSTRACT

An engineering model is described for a home gateway and interface system and method for providing quality of service to a home LAN device on a home network that is not QoS capable. The gateway comprises a modem (e.g., cable, DSL modem) and a portal service proxy interface. The modem is connected between the home network and a WAN cable network, and is operable to bridge traffic between the home LAN of the home network and the WAN cable network. The portal service interface is connected to the modem and is utilized as a proxy for QoS reservations and data communications between the home LAN devices on the home network. The portal interface acts on behalf of a client to make requests of the non-QoS capable home LAN devices and communicate these QoS needs to the QoS capable devices. The portal service interface is operable to manually input and obtain a set of QoS requirements of a client or user, for example, using a protocol such as the HTTP or Telnet protocol on a web browser. The QoS requirements are then utilized in the gateway and communicated to the home LANs thru the modem for selectively transmitting or receiving the data between the devices, based on the QoS needs of each home LAN device obtained from the client.

23 Claims, 7 Drawing Sheets

U.S. PATENT DOCUMENTS

| | | | |
|---|---|---|---|
| 2003/0142681 A1* | 7/2003 | Chen et al. | 370/401 |
| 2003/0229809 A1* | 12/2003 | Wexler et al. | 713/201 |
| 2004/0022247 A1* | 2/2004 | Chen et al. | 370/395.5 |
| 2004/0081098 A1* | 4/2004 | Sakai | 370/236.1 |
| 2004/0085949 A1* | 5/2004 | Partanen et al. | 370/352 |
| 2004/0085968 A1* | 5/2004 | Chen et al. | 370/397 |
| 2004/0090924 A1 | 5/2004 | Giaimo et al. | |
| 2004/0125779 A1* | 7/2004 | Kelton et al. | 370/338 |
| 2005/0058161 A1* | 3/2005 | Sorokopud et al. | 370/912 |
| 2006/0182119 A1* | 8/2006 | Li et al. | 370/395.52 |

OTHER PUBLICATIONS

"Techniques for Supporting QoS", DR. Chris Edwards, Lancaster University, QoS Workshop 26th Jul. 2001, 13 pgs.

Office Action Summary, U.S. Appl. No. 10/748,042, filed Dec. 29, 2003, 24 pgs.

Reply to Office Action dated Aug. 2, 2007, filed with the USPTO on Jan. 25, 2008 for U.S. Appl. No. 10/748,042, 5 pgs.

U.S. Appl. No. 10/748,042, Mazzola, filed Dec. 29, 2003, Entire Document.

* cited by examiner

SYSTEM USING PORTAL SERVICE INTERFACE TO REQUEST AND DETERMINE QOS REQUIREMENTS ON NON-QOS CAPABLE DEVICE ON A HOME NETWORK

FIELD OF INVENTION

The present invention relates generally to home networking and more particularly to home gateway and interface systems and methods for providing quality of service to home LAN devices that are not QoS capable.

BACKGROUND OF THE INVENTION

Recently, a team for the CableHome Initiative has been working to adopt a CableHome (CH) specification. This effort is being developed by industry leaders at the direction of the Cable Television Laboratories (CableLabs) for the benefit of the consumer and these industries. The Cable-Home initiative and specification provides a universal home network for data communications (traffic) between consumer electronic devices in and around the home and to a Wide Area Network (WAN) such as the Internet supplied by a cable provider. A CH compliant device on this home network will make its Quality of Service (QoS) needs known to the Subnet Bandwidth Manager (SBM) and any other SBMs in the path between itself and a peer device on the home network. These QoS needs are obtained and reserved for the CH compliant device using a level 3 protocol, such as the Resource Reservation Protocol (RSVP). The device will then follow the directives of the SBM for use of the reserved bandwidth at layer 2.

One of the problems for the QoS team to solve, is how non-CH compliant devices may be accommodated in this CH environment. Non-CH compliant devices will not follow the directives of the SBM, which acts as an arbiter for the fair distribution of bandwidth in a particular Local Area Network (LAN) segment of the home network. These non-CH compliant devices will often transmit without regard to other devices, causing data packet collisions and general degradation of the overall quality of the system. Conversely, during reception, these devices are handicapped to make any type of request, and are therefore subject to the use and abuse of those devices that can request bandwidth in an organized manner. In this regard, these non-CH compliant devices may also be considered non-QoS capable devices.

Thus, the non-CH compliant devices may be incapable of making known to the other devices in the network its QoS needs and to follow the lead of the SBM in the LAN it is connected to. Therefore, if the non-CH device has a passive role in the exchange of information, it may not be able to get the bandwidth needed from the network. Further, if the non-CH device takes an active transmitter role, the CH system may be adversely affected by the non-CH device.

Although the CH compliant home LAN devices are smarter to implement a protocol for communicating the QoS needs of the device, there is also a cost for the development of the application to add this capability to present non-CH compliant home LAN devices. Thus, it is also desirable to utilize current non-CH compliant devices in a CH compliant home network.

Accordingly, there is a need for an improved system to provide QoS capability to non-CH devices and other such non-QoS capable home LAN devices in a home network, without the additional development costs or added component costs for converting a non-CH device to a CH compliant device.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a home gateway and method to provide QoS capability to a non-QoS capable home LAN device using a proxy interface at the gateway. In an exemplary aspect of the present invention, the home gateway and method may be implemented in a cable modem having a Portal Service (PS) with QoS capability. The PS is the entity at the modem, generally a software stack that embodies the features defined by the CH specification and by the present invention together with the proxy interface, which is also referred to herein as a PS proxy interface. The cable modem is connected between the home network and a WAN cable network to bridge traffic between a home LAN of the home network and the WAN network. The home network may comprise multiple home LANs (or LAN segments), each LAN segment having one or more QoS capable (e.g., CH compliant), or non-QoS capable (e.g., non-CH compliant) home LAN devices.

The portal service (PS) interface of the cable modem is utilized as a proxy for QoS reservations and data communications between the home LAN devices on the home network. The PS interface may be embedded within the cable modem, for example, or exist as a standalone device connected to the cable modem. The PS interface acts on behalf of a client (a device or a user on a network running the interface or computer application for the interface) to make requests of the non-QoS capable home LAN device(s) and to communicate these QoS needs to the QoS capable devices on the home network. The QoS capable devices can then be controlled to avoid the abuse of the transmissions of the non-QoS devices, if they are initially informed about the behavior of the non-QoS devices. In the same way, this QoS information may be used to control the QoS capable devices to limit their use of bandwidth to allow adequate bandwidth for the non-QoS capable data receivers.

In another aspect of the invention, the PS offers an interface that allows the manual request of QoS parameters for the non-QoS capable devices using a web browser protocol such as HTTP (Hypertext Transfer Protocol), Telnet or another mechanism. HTTP, for example, is a client/server application-level protocol designed to support hypermedia information systems and manage the exchange of information. In this example, the HTTP protocol would be used with the document formatting language HTML (Hypertext Markup Language) to proxy or poll the client for the QoS information of the non-QoS capable devices on the home LAN. The QoS information of each device is then shared and managed on the network by all the SBMs between itself and a peer device in accordance with the CH specification. To facilitate this, in yet another aspect of the present invention, the PS interface triggers a session (e.g., an RSVP or another such QoS compliant reservation protocol session) with the remote peer following the conventions defined in the CH specification. The PS interface through the local manual set-up, for RSVP purposes, will act as a proxy to the non-CH device for some or all the LAN segments that are not local to the device. Thus, for the remote peer device, the RSVP messages will appear to come from a compliant CH device providing QoS to the non-QoS capable device.

In accordance with still another aspect of the invention, the portal service interface may comprise hardware, firmware, software or another such device, system, or application supportive of the proxy function to retrieve information from the user on behalf of the non-QoS LAN device and convey it to the LAN local to the device.

In yet another aspect of the invention, QoS information retrieval, may be retrieved manually or automatically using, for example, a traffic monitoring system operable to determine QoS requirements of a non-QoS home LAN device. In another aspect of the invention, the traffic monitoring system is further operable to automatically determine the QoS requirements of the LAN devices on the home network from the client, to establish a connection between the devices on the home LAN, and to manage the exchange of information between the devices based on the QoS needs of the devices.

Therefore, the inventive aspects of the home gateway provide QoS capability to non-QoS capable home devices without the additional development costs or added component costs of converting a non-CH device to a CH compliant device. In addition, consumers may be encouraged to utilize the cable network, and the CableHome compliant devices when they realize the increased diversity of devices, which may be easily brought into compliance using the present invention.

The present invention further contemplates a gateway or PS proxy interface as a consumer electronics chip/chipset, operable to accommodate cable modems and other such LAN bridging network devices. Some consumer electronics manufacturers making both cable modems and home LAN devices may have particular end-product interest in such a chip/chipset.

Still another aspect of the invention provides a method of QoS provisioning a non-QoS capable home LAN device on a home network using a gateway having a portal service proxy interface. The method uses the portal service proxy interface to request (e.g., using an HTTP protocol on a web browser, manually) the QoS needs of a non-QoS capable home LAN device from a client. The QoS needs of the non-QoS device are input and reserved into the gateway utilizing a non-RSVP reservation protocol.

The data communications traffic between the home LAN devices on the home network may then be prioritized, for example, based on the QoS needs of all the QoS capable and non-QoS capable devices on the home network. Based on the traffic priorities established, the QoS parameters of all the QoS capable home LAN devices are then adjusted to control and manage the traffic priorities. A reservation (e.g., using an RSVP) from the gateway is then initiated on behalf of the non-QoS capable device to the other home LAN devices on the home network. Finally, the data communications is transmitted between the home LAN devices on the home network based on the QoS needs of all the devices on the home network.

The method may further comprise provisioning the QoS needs of the device into the gateway utilizing a non-RSVP reservation protocol, and is accomplished utilizing an automatic reservation detection operation.

The method may further comprise regulating traffic on the home LAN for each of the home LAN devices based on the prioritization that the PS accomplishes on its own transmissions and the transmissions of other devices onto a LAN based on the traffic information obtained through the proxy interface of the traffic to the non-QoS capable home LAN device on the home network.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
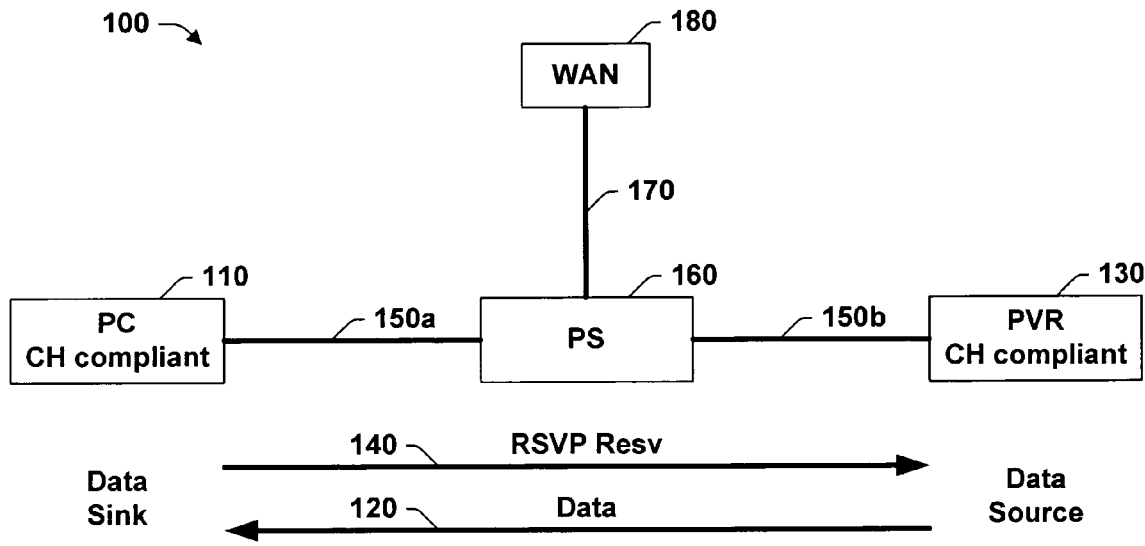
FIGS. 1 and 2 are prior art diagrams of home networks providing QoS service between two LAN segments having CableHome compliant customer premises equipment using a home gateway.

The present invention will now be described with reference to the attached drawings, wherein like reference numerals are used to refer to like elements throughout. The invention relates to a home gateway and portal service (PS) proxy interface for a QoS capable network for the home consumer electronics marketplace, semiconductor manufacturers, and the cable industry. The PS interface is utilized as a proxy for QoS reservations and data communications between home LAN devices on the home network. The portal interface acts on behalf of a client to make requests of a non-QoS capable home LAN device and communicate these QoS needs to the QoS capable devices in association with, for example, the RSVP protocol.

Normally, as discussed, a QoS capable or CH compliant device on this home network will make its Quality of Service (QoS) needs known to the Subnet Bandwidth Manager (SBM) and any other SBMs in the path between itself and a peer device on the home network. These QoS needs are obtained and reserved for the QoS capable or CH compliant device using a level 3 protocol, such as the Resource Reservation Protocol (RSVP). The device will then follow the directives of the SBM for use of the reserved bandwidth at layer 2.

Non-QoS capable (e.g., non-CH compliant) devices, however, will not follow the directives of the SBM, therefore the bandwidth in the LAN segments of the home network will not be equitably distributed. These non-CH compliant or non-QoS capable devices may often transmit without regard to other devices on the network, producing packet loses and delays due to collisions and an overall degradation in the quality of the system. Further as discussed, during reception, these devices are basically handicapped to make any type of request, and are therefore subject to the use and abuse of those devices that can request bandwidth in accordance with the CableHome specification.

In other words, other solutions provide end to end QoS to home client devices by relying on the client device to make the QoS request (e.g., through a protocol such as RSVP). This QoS request may be made of itself without any user intervention. For example, an application in the device determines the QoS needs of the device in its LAN and/or the WAN, and using the protocol, passes that information to the home gateway. These requests propagate through the LAN and/or the WAN until they reach the other end-point device.

The solution presented herein, relies on the home gateway to proxy the end client device for the QoS needs, and to generate the QoS reservations using the protocol (e.g., through a protocol such as RSVP) that the end client would otherwise use. Thus, the QoS needs of the non-QoS device or devices and their applications are made known to the home gateway of the present invention, through a (e.g., manual) operation of the client/user. In one example, the user directly communicates the QoS needs of the devices to the home gateway. Thus, the non-QoS devices are relieved from having to determine their QoS needs and from implementing a protocol to communicate those needs. In particular, these needs may be communicated by implementing an interface between the user and the non-QoS device. For example, a portal service proxy interface (PS interface) may be used to implement manual QoS setups to replace or mitigate the functions of a QoS compatible device, utilizing a protocol such as RSVP.

An advantage of this solution is that the end client device needs little or no resources to generate QoS requests. This results in cost savings for the development of applications and devices that need QoS from the LAN connected to the home gateway. These devices can then be relatively simple and inexpensive.

In accordance with the present invention, several implementations of the home gateway and the PS proxy interface operating within that gateway will now be discussed more fully with references to the accompanying figures. The invention will be described in the context of the interface either embedded within a cable modem or acting as a standalone device connected to and operating in concert with a cable modem or another such device operable to bridge the LAN/WAN gateway. The subsequent figures, which depict an exemplary method of interfacing and provisioning QoS requirements from a non-QoS capable device, are flow charts of the operation of such a proxy interface (e.g., an HTTP interface operating within a web browser using HTML language to manually extract the QoS needs of a non-QoS home LAN device).

Figure 2:
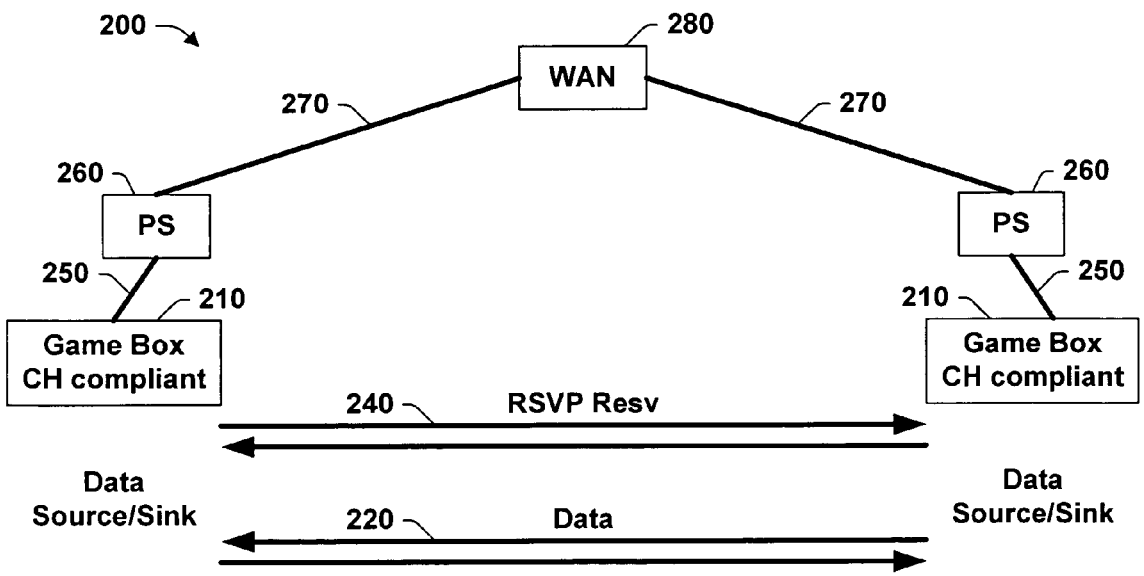

FIGS. 1 and 2 illustrate prior art diagrams of home networks providing QoS service between two LAN segments having CableHome (CH) compliant customer premises equipment (CPE) using a home gateway. In both of the figures, a CH compliant home LAN device or CPE attempts to exchange data communications using an RSVP protocol with another such CPE. In the Integrated Services (IntServ)/SBM model for QoS reservations, an RSVP Reservation message circulates through the LANs in the path between the data sink and the data source. The RSVP Reservation (RSVP Resv) is originated by the sink, and in its path, triggers reservations in the LANs at layer 2. This path goes through the SBMs of the LANs as illustrated in FIGS. 1 and 2.

In prior art home network 100 of FIG. 1, for example, a CH compliant personal computer PC 110 is the sink for the data 120 (e.g., a two hour movie of video communications data) originating from a CH compliant personal video recorder PVR 130. The reservation message (e.g., RSVP Resv) 140 sets the QoS service flows in the two LAN segments 150a and 150b, conveying information of the needs or requirements of the QoS flow to the SBMs of the two LANs 150a and 150b, which in turn accommodate the LAN environment to support them. After successful completion of this process, data (e.g., data communications) 120 begins flowing from the PVR 130 to the PC 110.

In the conventional home network 100, a cable modem CM may be used as a portal service PS 160, to bridge traffic between home LANs (LAN segments 150) or home computers, for example, and the cable network 170 extending to a wide area network WAN 180. The portal service is a term currently used by CableHome. The PS, as defined in the CableHome specification, may be thought of as the entity to which all the gateway requirements apply. The PS normally resides within a cable modem CM and may be a software stack within the CM.

In prior art home network 200 of FIG. 2, for example, two CH compliant game boxes 210 perform both as the sink to data 220 by another CH compliant game box 210, and as a source of data 220 sent to the other. The communication is bidirectional. Each sink initiates a reservation RSVP Resv 240 that circulates from each CH domain through the WAN domain establishing QoS flows in all the layer 2 segments along the path, and in the opposite direction of the reservation RSVP Resv 240. In this case, reservations and data flow between the CH domains of the game boxes 210 and LAN segments 250, bridged by PS 260 through the cable network 270 and the WAN domain 280. For the purpose of this example, it is assumed that the reservation 240 is critical only in the WAN 280, as the gaming boxes 210 are the only clients in the CH environment, and that the LAN 250 has ample bandwidth capacity to support them, such that the reservation RSVP Resv 240 is accomplished in all the segments (250, 270) between the two end applications.

In both of the prior art examples of FIGS. 1 and 2 above, it is a requisite for the successful establishment of QoS reservations between sink and source that the two home LAN devices support RSVP (or another such QoS capable reservation protocol), implying that they are CH compliant. Devices that are not CH compliant cannot be provided with QoS under this model, because they do not depend on RSVP or another QoS capable protocol to inform the various SBMs about their QoS needs.

The solution to these problems of the prior art, in accordance with the present invention, is presented in two parts. First, an interface is defined at the PS to allow for certain QoS policies to be set (e.g., manually) rather than through (e.g., RSVP). For example, the PS may offer an HTML interface to the user or client for this purpose (e.g., an HTTP interface operating within a web browser using HTML language to manually extract the QoS needs of a non-QoS capable or non-CH compliant home LAN device). Second, the PS has the capability to trigger RSVP sessions for the domains and towards CH devices where possible.

The basic philosophy of the prior art is that the gateway (PS) simply bridges the messages (RSVP) as a connecting node in the communications path between clients. In the prior art, the client home LAN device sets the (e.g., RSVP) session and has no RSVP stack, whereas in the present invention, the portal service PS has the new proxy interface stack and accomplishes this operation. Since the PS proxies the client in the present invention, the client device(s) may be light on resources (e.g., hardware, software, firmware and the associated development costs), as it does not need to implement the RSVP session operations.

Figure 3:
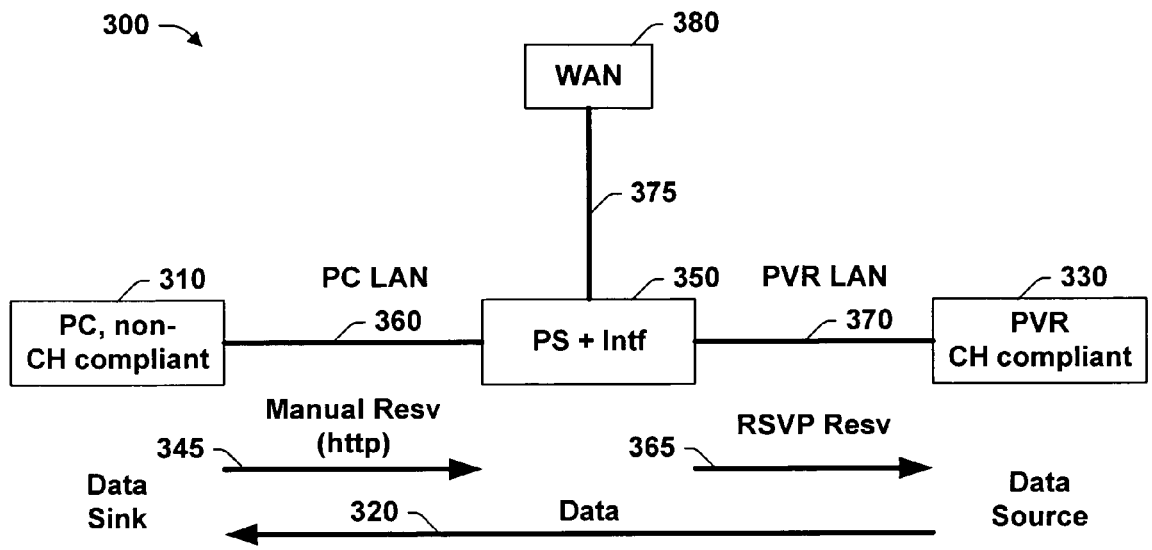
FIGS. 3 and 4 are diagrams of exemplary home networks providing QoS service between two LAN segments having non-QoS capable customer premises equipment using a home gateway having a proxy interface in accordance with various aspects of the present invention.
Figure 4:
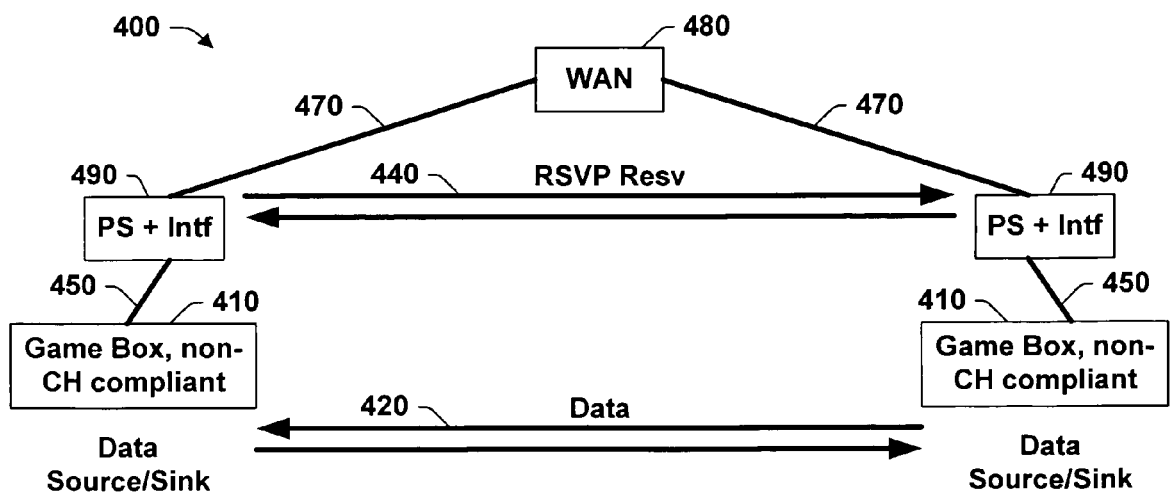

FIGS. 3, and 4 illustrate diagrams of exemplary home networks providing QoS service between two LAN segments having non-QoS capable (e.g., non-CH compliant) customer premises equipment using a home gateway having a proxy interface in accordance with various aspects of the present invention. FIGS. 3 and 4 are similar to the home networks 100 and 200 of FIGS. 1 and 2, except that at least one non-CH compliant CPE resides on a LAN segment of the home network and a proxy interface is included in the home gateway, in accordance with the present invention.

FIG. 3, for example illustrates an exemplary home network 300. In this case, however, a PC 310 running an application that is non-QoS capable (e.g., non-CH compliant in this example) requests data (e.g., 2 hours of video communications data) 320 of a CH compliant personal video recorder PVR 330 with QoS parameters comprising, for example, a guaranteed minimum bandwidth and a jitter constraint. The user through PC 310 provisions 345 the PS 350 with these QoS parameters in the PC LAN 360. All the CH compliant devices in the PC LAN 360 are instructed by the server message block (SMB) used in the SBM to adjust these QoS parameters. The PS 350, in turn, then initiates an RSVP session (RSVP 365) against the PVR 330 in the PVR LAN 370. Thus, the needs of the PC 310 may be made known (provisioned) to the PC LAN SBM at the portal service PS 350 using, for example, an HTTP manual reservation Manual Resv 345 as a proxy interface in place of the conventional RSVP.

After successful completion of this reservation proxy process, data (e.g., data communications) 320 begins flowing from the PVR 330 to the PC 310. As in the conventional home network 100 of FIG. 1, the exemplary portal service PS proxy interface 360, may be implemented within a cable modem CM of the home network 300 of FIG. 3. The cable modem is used to bridge traffic between home LAN segments 360 and 370 or home computers, for example, and the cable network 375 extending to a wide area network WAN 380.

In the exemplary home network 400 and scenario of FIG. 4, the gaming boxes are non-QoS capable (e.g., non-CH compliant in this example) home LAN devices 410. Again, two game boxes 410 perform both as the sink to data 420 by another game box 410, and as a source of data 420 sent to the other. The data communications 420 and reservations 440 are bidirectional. Because the two LAN segments 450 have sufficient bandwidth to support the application, and because the gaming boxes 410 are the only devices in their corresponding LANs 450, QoS within the home environment is a non-issue. However, when viewed from the perspective of the entire network 400, QoS is still an important issue for contentions, collisions and delays in the larger cable network 470 and the WAN domain 480.

The process functions as follows: the users know that they need guaranteed bandwidth for their bi-directional traffic flow 420, and trigger the reservations 440 from each individual portal service PS 490 using the PS proxy (e.g., HTML) interfaces of the portal services PS 490. Once the bi-directional reservations 440 are established between the portal services PS 490, data 420 circulates between the gaming boxes 410. In addition to QoS, the PS proxy (e.g., HTML) interface of the portal services PS 490, may be utilized by the user to set other parameters of the connection such as privacy (VPN).

Each sink initiates a reservation RSVP Resv 440 that circulates from each CH domain through the WAN domain establishing QoS flows in all the layer 2 segments along the path, and in the opposite direction of the reservation RSVP Resv 440. In this case, reservations and data flow between the CH domains of the game boxes 410 and LAN segments 450, bridged by PS 460 through the cable network 470 and the WAN domain 480. For the purpose of this example, it is assumed that the reservation 440 is critical only in the WAN 480, as the gaming boxes 410 are the only clients in the CH environment, and that the LAN 450 has ample bandwidth capacity to support them, such that the reservation RSVP Resv 440 is accomplished in all the segments (450, 470) between the two end applications.

Figure 5:
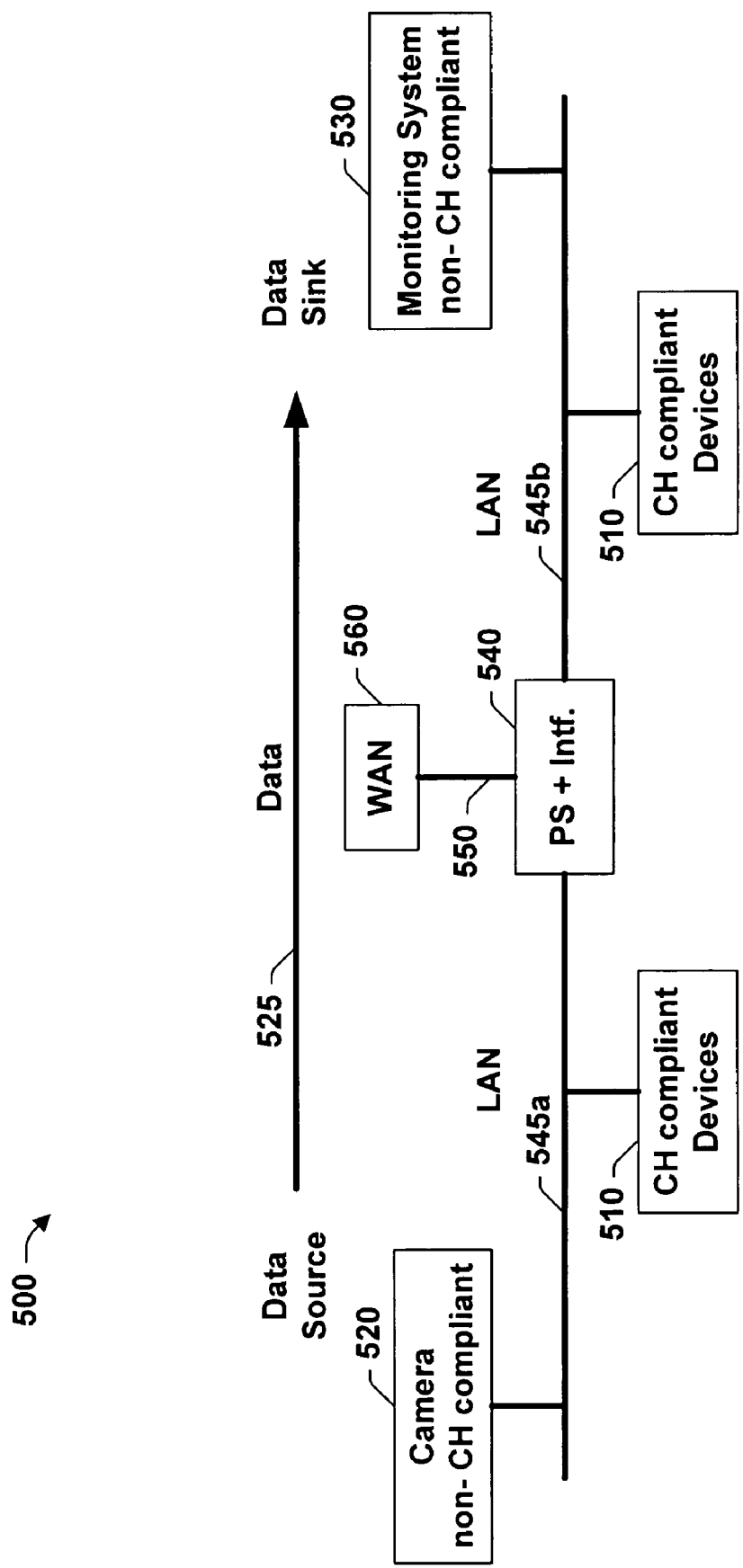
FIG. 5 is a diagram of an exemplary home gateway having a proxy interface in a home network providing QoS service between LAN segments having non-QoS capable customer premises equipment in accordance with the present invention.

FIG. 5 illustrates an exemplary home gateway residing within a home network 500 having a proxy interface in accordance with the present invention. The home network 500 of FIG. 5 represents a home security system. The LANs of the security system 500 interconnect several QoS capable or CH compliant home LAN devices 510 and a non-QoS capable (e.g., non-CH compliant) camera 520 for home security reporting data 525 to a centralized non-CH compliant monitoring system 530.

The home network 500 comprises a home gateway portal service PS 540 having a proxy interface providing QoS service between LAN segments 545a and 545b having one or more non-CableHome compliant devices 520 and 530. The home gateway PS 540 also bridges traffic between the home network and a cable network 550 extending to a WAN domain 560. The CH compliant devices may, for example, comprise a PC, a security sensor, a DSC, a DVD-PVR or another such home LAN device, host or CPE.

Security cameras, in one example, are generally simple devices that generate a fixed video rate of 16 kbps with packets spaced regularly, and without computational capability. As inexpensive devices, the cameras may not generate (e.g., RSVP) messages or follow the directions of the SBM, and thus is not CH compliant. The cameras simply inject fixed data rate traffic into the LAN at fixed intervals with a high priority relative to the nature of the service.

In accordance with the present invention, QoS service may be provided for both the CH compliant devices 510 and the non-CH compliant camera 520, by instructing the PS 540 (e.g., manually) as to the nature of the packets arriving from the camera 520 on one LAN segment 545a, and transmitted to the monitoring system 530 on the other LAN segment 545b. In both LANs, the SBM keeps the CH compliant devices (active devices) 510 transmissions away from the transmission intervals of the camera 520, at least for those transmissions that can be predicted. The SBM keeps the active device transmissions out of the transmission times of the camera to avoid packet losses and delays due to collisions. The gateway 540 is also active with respect to the QoS function transmissions toward the monitoring system 530, in regard to the internal resources of the gateway. In this respect, the gateway 540 also has an active role, re-transmitting to the monitoring system 530 the communications data 525 received from the camera 520.

Since only one data packet may be transmitted from the gateway on any of the LANs at a given time, the gateway must decide which data packet to transmit first, in accordance with another aspect of the invention. The gateway may make these ordering decisions based on a QoS prioritization of the parameters such as delay, maximum bandwidth, or minimum bandwidth. Generally, as the bandwidth decreases the delay increases.

Figure 6A:
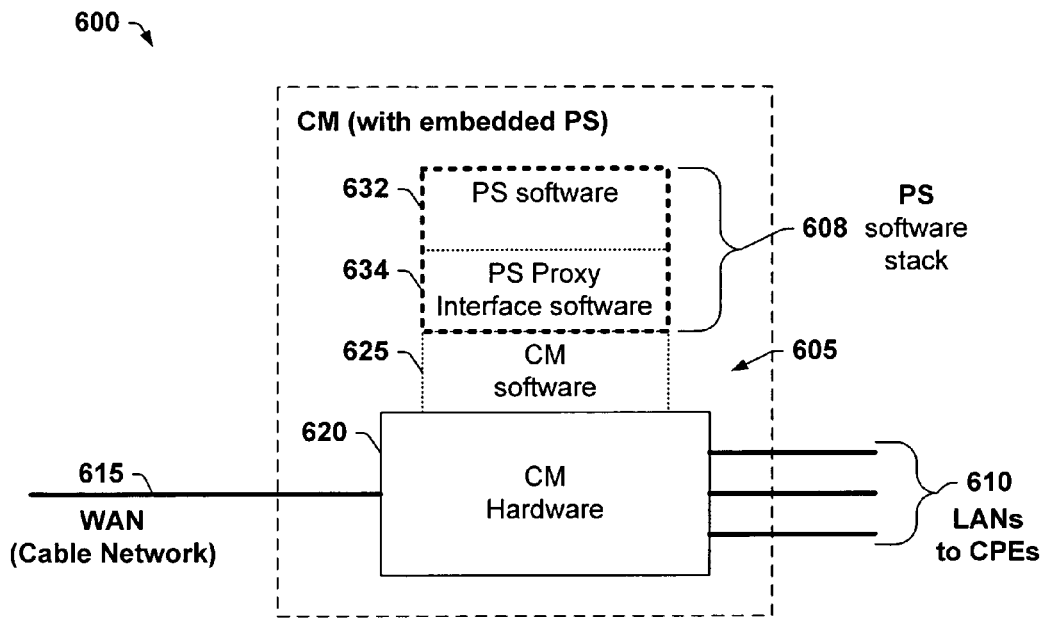
FIG. 6A is a simplified diagram of an exemplary home gateway comprising a cable modem with an embedded proxy interface for providing QoS service between LAN segments having non-QoS capable customer premises equipment used in accordance with the present invention.

FIG. 6A illustrates an exemplary home gateway 600 in a home network. The gateway 600 comprises a modem, for example, a DSL modem or a cable modem (CM) 605 having an embedded portal service (PS) 608 for providing QoS service between LAN segments 610 having non-QoS capable customer premises equipment and a cable network WAN 615 in accordance with the present invention.

The cable modem 605 has CM hardware 620 to physically bridge or connect between the LANs 610 and/or the cable network WAN 615. The cable modem 605 further has CM software 625 to support and control the operations of the cable modem 605.

The portal service PS 608 comprises, for example, a software stack having PS software 632 which is typically used in portal service operations, and a PS proxy interface (e.g., software or firmware) 634 used to poll (e.g., manually request) the user for the QoS needs of non-QoS capable CPEs on the LAN segments 610 local to the home network in accordance with the present invention. The PS proxy interface (e.g., software, or firmware) 634 may further comprise an interface (e.g., HTTP, Telnet) operating within a web browser using (e.g., HTML) language to enter (e.g., manually enter) the QoS needs of the non-CH home LAN device.

To implement the gateway 600, for example, a conventional cable modem may be adapted with additional software/firmware to provide the portal services and the proxy interface operations capabilities in accordance with the present invention.

Figure 6B:
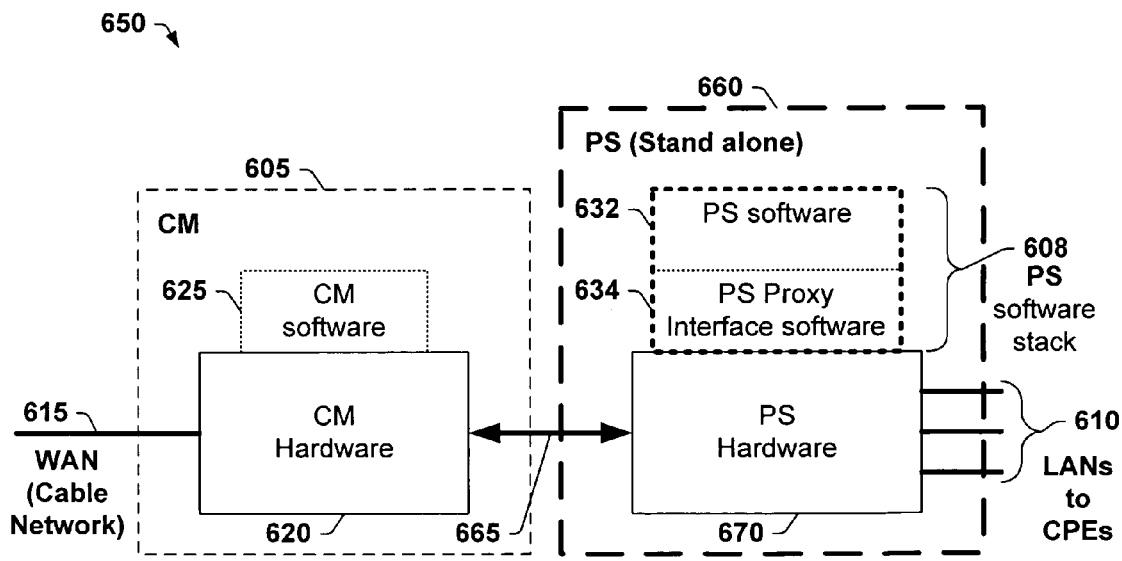
FIG. 6B is a simplified diagram of an exemplary home gateway comprising a cable modem and a stand alone proxy interface for providing QoS service between LAN segments having non-QoS capable customer premises equipment used in accordance with the present invention.

FIG. 6B illustrates an exemplary home gateway 650 comprising a cable modem 605 connected to a stand alone portal service unit 660, yet the home gateway 650 functions similar to the home gateway 600 of FIG. 6A. Gateway 650 of FIG. 6B comprises a generally conventional DSL or cable modem (CM) 605 for physically bridging traffic between the cable network WAN 615 and LAN segments 610 via the standalone portal service unit 660. The cable modem CM 605 comprises CM hardware 620 to physically bridge or connect between the standalone portal service unit 660 and the cable network WAN 615 coupled therebetween by an intermediate LAN segment 665. The cable modem 605 further has CM software 625 to support and control the CM hardware 620 and the various operations of cable modem 605.

The standalone portal service unit 660 comprises portal service hardware 670 and the portal service (PS) 608 (e.g., software stack). The portal service hardware 670 bridges traffic and QoS services between the cable modem CM 605 and the LAN segments 610. As before, the portal service PS 608 comprises, for example, a software stack having PS software 632 typically used in portal service operations, and a PS proxy interface (e.g., software or firmware) 634. The PS proxy interface is again used to poll (e.g., manually request) the user for the QoS needs of non-QoS capable CPEs on the LAN segments 610 local to the home network in accordance with the present invention.

Thus, the gateway 650 of FIG. 6B has a standalone portal service unit 660 connected to a cable modem 605, which together provide QoS service between LAN segments 610 having non-QoS capable (or non-CableHome compliant) customer premises equipment and the cable network WAN 615 via the hardware 620 of the cable modem 605 in accordance with the present invention. In addition to the embedded or standalone implementations, other such implementations of the portal service proxy interface of the present invention are anticipated including single or multiple chip-sets, firmware, and software implementations, including remote LAN locations. The proxy interface of the present invention may be implemented using a PC client on the network running the proxy interface application, for example, at the PS or at any other point on the home LAN.

Although the portal service interface has been described, in one implementation, as a manual QoS entry application (e.g., HTTP application), the PS interface may alternately comprise an active traffic monitoring system operable to automatically determine the QoS requirements of a non-QoS home LAN device. The traffic monitoring system may be further operable to automatically establish a connection between the devices on the home LAN, and to manage the exchange of information between the devices based on the QoS needs of the non-QoS capable device.

Because only one frame may be transmitted at a time from the PS of the present invention, the PS of necessity must place the data frames in some order. The inventor of the present invention has realized that this potential problem also provides another opportunity. In another aspect of the present invention, the PS may prioritize the data communications traffic it transmits on the home LAN based on the needs of all the QoS and non-QoS devices on the home network. The QoS parameters of all the QoS capable home LAN devices may then be adjusted to control the ordering of the transmissions based on the traffic priorities established.

In order to better appreciate one or more features of the present invention, several methods of QoS provisioning a non-QoS capable home LAN device on a home network using a home gateway having a proxy interface are hereinafter illustrated and described with respect to the following figures.

Figure 7:
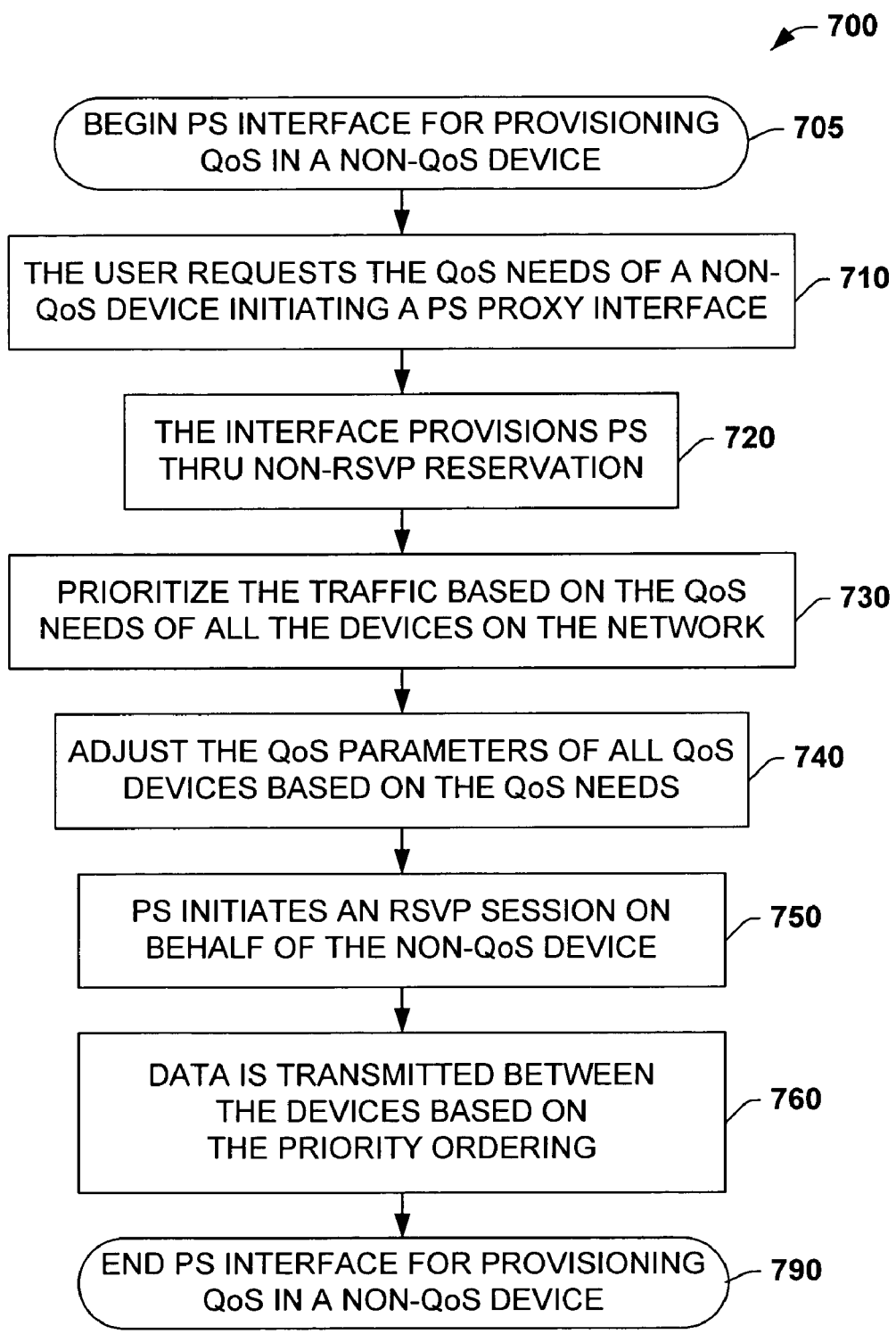
FIGS. 7-9 are flow charts illustrating various method aspects of provisioning and managing QoS service flows for non-QoS capable home LAN devices in a QoS capable home network in accordance with the home gateways of FIGS. 3-6, and various aspects of the present invention.
Figure 8:
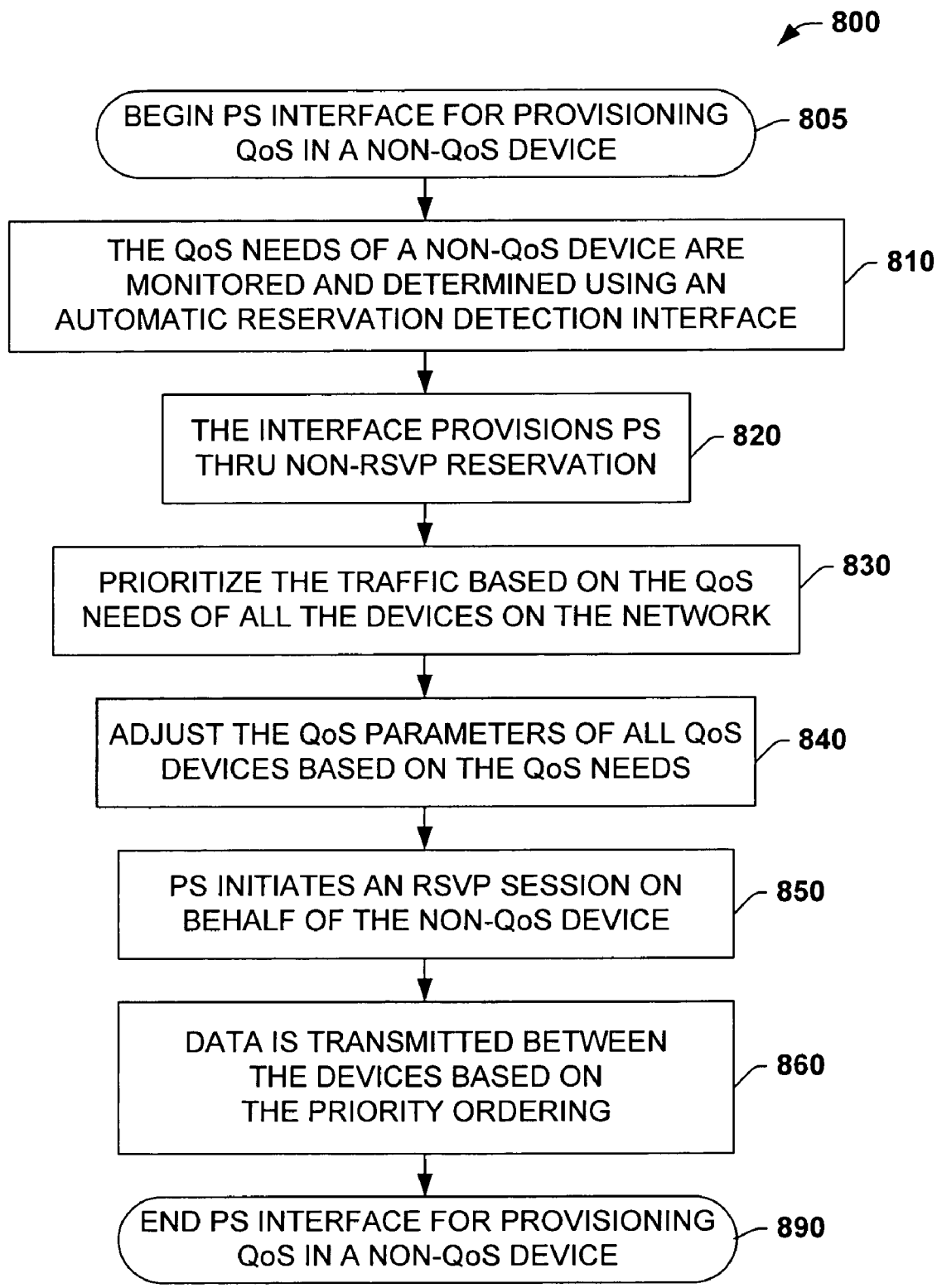
Figure 9:
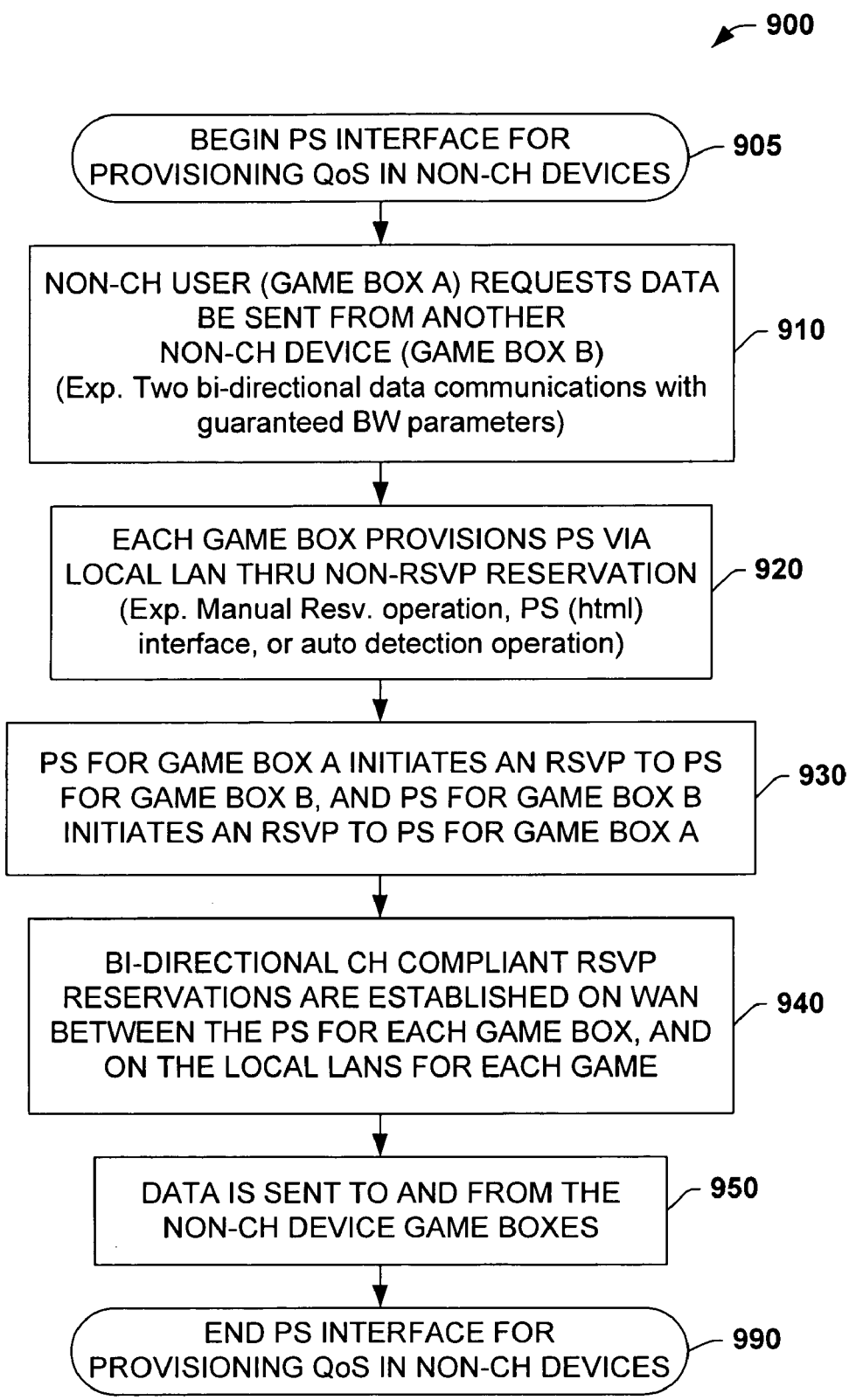

FIGS. 7-9 illustrate flow charts of various method aspects of provisioning and managing QoS service flows for non-QoS capable home LAN devices in a CH compliant home network in accordance with the home gateways of FIGS. 3-6, and various aspects of the present invention.

In these examples, a user may directly notify (e.g., using a PC) the home gateway of the QoS needs of the non-QoS capable devices on the home LAN by initiating a portal service proxy interface (e.g., HTTP), or another such non-RSVP application. The data communications traffic on the home LAN is then prioritized based on the needs of all the QoS and the non-QoS devices on the home network. The QoS parameters of all the QoS capable home LAN devices are then adjusted based on the traffic priorities established. A reservation from the gateway is then initiated on behalf of the non-QoS capable device to the other home LAN devices on the home network. Finally, the data communications between the home LAN devices is transmitted in a priority order based on the QoS needs of all the devices on the home network.

FIG. 7, for example, illustrates an exemplary method 700 of provisioning and managing QoS service flows for non-QoS capable home LAN devices in a QoS capable home network. In the proposed home gateway and PS proxy interface (e.g., 350, 490, 540, 600, 650) of FIGS. 3-6, a non-QoS capable home LAN device (e.g., 310, 410, 520, and 530) on a home network (e.g., 300, 400, 500, 610) may be QoS provisioned directly by a user. For example, a user connects a PC (e.g., 310 of FIG. 3) at the gateway PS 350 or elsewhere on the home LAN (360 and 370) and initiates the HTTP proxy interface 634 (application), or another such non-RSVP protocol 634. The non-RSVP protocol provisions the QoS needs of the non-QoS device into the gateway using a non-RSVP reservation (e.g., 365, 440).

The data communications traffic (e.g., 320, 420, 525) on the home LAN (e.g., 360, 370, 450, 550) is then prioritized based on the needs of all the QoS and the non-QoS devices on the home network. The QoS parameters of all the QoS capable home LAN devices are then adjusted based on the traffic priorities established. A reservation (e.g., 345, 440) from the gateway (e.g., 350, 490, 540, 600, 650) is then initiated on behalf of the non-QoS capable device to the other home LAN devices on the home network. Finally, the data communications (e.g., 320, 420, 525) between the home LAN devices is transmitted from the gateway (e.g., 350, 490, 540, 600, 650) in a priority order based on the QoS needs of all the devices on the home network.

While the method 700 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 700 according to the present invention may be implemented in association with the network elements, devices, protocols, formats and applications illustrated and described herein as well as in association with other elements, devices, protocols, formats and applications not illustrated.

The exemplary PS proxy interface method 700 of FIG. 7, in accordance with the home gateway and proxy interface of FIGS. 3-6, begins at 705. Initially at 710 the user 310 (e.g., user or client on a PC) requests the QoS needs of a non-QoS (e.g., non-CH) device 120, 520, 620 (e.g., host display, television, PC, projector) by initiating a non-RSVP (e.g., HTTP proxy interface) protocol application 634. At 720 the non-RSVP protocol provisions the QoS needs of the non-QoS device into the gateway using a non-RSVP reservation (e.g., 365, 440).

The data communications traffic (e.g., 320, 420, 525) on the home LAN (e.g., 360, 370, 450, 550) is then prioritized at 730 based on the QoS needs of all the QoS and the non-QoS devices on the home network (e.g., 300, 400, 500). The QoS parameters (e.g., maximum or minimum guaranteed bandwidth, delay) of all the QoS capable home LAN devices are then adjusted at 740 based on the traffic priorities established. A reservation (e.g., 345, 440) from the gateway (e.g., 350, 490, 540, 600, 650) is then initiated in an RSVP reservation session at 750 on behalf of the non-QoS capable device (e.g., 310, 410, 520, 530) to the other home LAN devices on the home network. Finally, the data communications (e.g., 320, 420, 525) between the home LAN devices is transmitted at 760 from the gateway (e.g., 350, 490, 540, 600, 650) in a priority order established by the prioritization of the QoS needs of all the devices on the home network.

Thereafter, the PS proxy interface method ends at 790, wherein one or more additional non-QoS capable devices may be provisioned by the user utilizing the PS proxy interface within a home gateway of a home network.

Referring now to FIG. 8, and exemplary optional method 800 is illustrated for provisioning the QoS needs of the device into the gateway utilizing a non-RSVP reservation protocol accomplished utilizing an automatic reservation detection operation. For example, method 800 of FIG. 8, is similar to that of the manual detection method of FIG. 7, and as such need not be fully described again for the sake of brevity. In particular, 810 in method 800 essentially replaces 710 of method 700. Otherwise, the automatic reservation detection method 800 of FIG. 8 assumes that the QoS needs may be detected by, for example, a traffic monitoring system capable of watching the traffic of all the QoS and non-QoS devices on a home LAN and determining the QoS needs (e.g., maximum and minimum bandwidth, delays), and making reservation requests on behalf of the non-QoS capable devices based on the needs of those devices.

Referring now to FIG. 9, an exemplary method 900 is illustrated for provisioning and managing QoS service flows for non-CH home LAN devices in a CH compliant home network in association with the home network 400 of FIG. 4. The proxy interface method 900 comprises a non-CH user (e.g., a game box) 410 initially requesting at 910 that data be sent from another non-CH user (e.g., a game box) 410. In this example, the data communications is bi-directional, and requires guaranteed BW parameters. At 920, each non-CH user game box 410 provisions the portal service and interface (gateway) PS 490 via the local LAN 450 thru the use of the non-RSVP reservation protocol (e.g., manual reservation operation, PS HTML interface, or automatic reservation detection operation). The PS for a first game box (A) 410 then initiates an RSVP reservation 440 at 930 to a second game box (B) 410, and the PS for second game box (B) 410 initiates an RSVP reservation 440 to the first game box (A) 410. In this way, at 940, bi-directional CH compliant RSVP reservations 440 are established on the WAN 480 between the PS 490 for each game box 410 and on the local LANs 450 for each game box 410. Finally, at 950, data 420 is sent to and from the non-CH device game boxes 410 on the home network 400.

Thereafter, the PS proxy interface method 900 ends at 990, wherein other non-QoS capable devices may be provisioned of the user or an automatic detection system utilizing the PS proxy interface within a home gateway of a home network.

Thus, the methods employing the proxy interface within a gateway of a home network using a non-RSVP protocol provide QoS for devices that are otherwise incapable of supporting QoS based protocols without the additional hardware, software or firmware costs associated with more expensive QoS based devices. This method thereby avoids these costs and the associated development costs of such devices for CH compliant home networks and other such networks. In addition the exemplary gateway and proxy interface system and method of the present invention facilitates multiple non-QoS capable home LAN devices on multiple home LAN segments simultaneously.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A home gateway for providing QoS to home LAN devices on a home network having a non-QoS capable device, the gateway comprising:
   a modem operable to bridge traffic between a home LAN of the home network and a WAN cable network; and
   a portal service interface connected to the modem, the interface adapted to operate as a proxy for QoS reservations associated with the non-QoS capable device and data communications traffic between the non-QoS capable device and other home LAN devices on the home network, wherein the portal service interface comprises a web browser operable to request, facilitate an input and determine the QoS requirements of the non-QoS capable device on the home network based on the input, wherein the web browser comprises an HTTP protocol to request, input and determine the QoS requirements of the non-QoS capable device on the home network, and wherein the HTTP protocol is further operable to request, facilitate a manual input associated with characteristics of the home LAN device, and determine the QoS requirements of the LAN device on the home network based on the manual input, wherein the determination is employed to establish a connection between the devices on the home LAN, and to manage the exchange of information between the devices based on the QoS needs of the devices.

2. The home gateway of claim 1, wherein the portal service interface is adapted to make requests for the non-QoS capable home LAN device operating as a client by obtaining a set of QoS requirements of the client and inputting such QoS requirements into the gateway for selectively transmitting or receiving data, based on the QoS needs of the non-QoS capable home LAN device on the home network.

3. The home gateway of claim 2, wherein the portal service interface is further adapted to obtain the QoS requirements of the client and communicate such QoS requirements to the home LAN thru the modem, thereby allowing the gateway to selectively control the local transmissions of the data originating from the gateway along with a QoS or non-QoS capable home LAN device on the home network to coordinate the QoS needs of all the home LAN devices on the home network.

4. The home gateway of claim 1, wherein the portal service interface comprises at least one of hardware, firmware and software.

5. The home gateway of claim 1, wherein the portal service interface is further operable to communicate the QoS needs of the non-QoS capable home LAN device to the home network using an RSVP reservation protocol.

6. The home gateway of claim 1, wherein the home network comprises multiple LAN segments.

7. The home gateway of claim 6, wherein the multiple LAN segments each comprise a QoS or non-QoS capable home LAN device.

8. The home gateway of claim 7, wherein the QoS capable home LAN device is CableHome compliant and the non-QoS capable home LAN device is non-CableHome compliant, respectively.

9. The home gateway of claim 1, wherein the home LAN device comprises customer premises equipment.

10. The home gateway of claim 1, wherein the modem is adapted to bridge traffic between multiple LAN segments of the home network.

11. The home gateway of claim 1, wherein the modem is one of a cable modem and a DSL modem.

12. The home gateway of claim 1, wherein the portal service interface further comprises a traffic monitoring system operable to automatically determine QoS requirements of the non-QoS home LAN device coupled thereto.

13. The home gateway of claim 12, wherein the traffic monitoring system is further operable to automatically establish a connection between the devices on the home LAN, and to manage the exchange of information between the devices based on the QoS needs of the device.

14. A home gateway for providing QoS to home LAN devices on a home network having a non-QoS capable device, the gateway comprising:

a portal service hardware unit operably coupled to a modem to bridge traffic between a home LAN of the home network and a WAN cable network; and a portal service interface connected to the portal service hardware unit, the interface adapted to operate as a proxy for QoS reservations associated with the non-QoS capable device and data communications traffic between the non-QoS capable device and other home LAN devices on the home networks, wherein the portal service interface comprises a web browser operable to request, facilitate an input, and determine the QoS requirements of the non-QoS capable device on the home network based on the input, wherein the web browser comprises an HTTP protocol to request, input and determine the QoS requirements of the non-QoS capable device on the home network, and wherein the HTTP protocol is further operable to request, manually input and determine the QoS requirements of the non-QoS capable device on the home network, to establish a connection between the devices on the home LAN, and to manage the exchange of information between the devices based on the QoS needs of the devices.

15. The home gateway of claim 14, wherein the portal service interface is further adapted to make requests for the non-QoS capable home LAN device as a client device, and input and obtain a set of QoS requirements of the non-QoS capable device into the gateway for selectively transmitting or receiving the data, based on the QoS needs of the non-QoS capable home LAN device on the home network.

16. The home gateway of claim 14, wherein the portal service interface is further adapted to obtain the QoS requirements of the non-QoS capable device and communicate such QoS requirements to the home LAN thru the modem, thereby allowing the gateway to selectively control the local transmissions of the data originating from the gateway along with a QoS or non-QoS capable home LAN device on the home network to coordinate the QoS needs of all the home LAN devices on the home network.

17. The home gateway of claim 14, wherein the portal service interface comprises at least one of hardware, firmware and software.

18. The home gateway of claim 14, wherein the portal service interface is further operable to communicate the QoS needs of the non-QoS capable home LAN device to the home network using an RSVP protocol.

19. The home gateway of claim 14, wherein the home network comprises multiple LAN segments.

20. The home gateway of claim 19, wherein the multiple LAN segments each comprises a QoS or non-QoS capable home LAN device.

21. The home gateway of claim 20, wherein the QoS capable home LAN device is CableHome compliant and the non-QoS capable home LAN device is non-CableHome compliant, respectively.

22. The home gateway of claim 14, wherein the home LAN device comprises customer premises equipment.

23. The home gateway of claim 14, wherein the modem is one of a cable modem and a DSL modem.

* * * * *